(12) United States Patent
Borgstadt

(10) Patent No.: US 11,240,959 B2
(45) Date of Patent: Feb. 8, 2022

(54) ADAPTIVE FORWARD-LOOKING BIOMASS CONVERSION AND MACHINE CONTROL DURING CROP HARVESTING OPERATIONS

(71) Applicant: Deere & Company, Moline, IL (US)

(72) Inventor: Justin Borgstadt, West Des Moines, IA (US)

(73) Assignee: Deere & Company, Moline, IL (US)

( * ) Notice: Subject to any disclaimer, the term of this patent is extended or adjusted under 35 U.S.C. 154(b) by 250 days.

(21) Appl. No.: 15/966,269

(22) Filed: Apr. 30, 2018

(65) Prior Publication Data

US 2019/0327889 A1    Oct. 31, 2019

(51) Int. Cl.
 *A01D 41/127*   (2006.01)
 *A01B 79/00*    (2006.01)
 *A01D 75/28*    (2006.01)

(52) U.S. Cl.
 CPC .......... *A01D 41/127* (2013.01); *A01B 79/005* (2013.01); *A01D 75/28* (2013.01)

(58) Field of Classification Search
 CPC ........................... A01D 41/127; A01B 79/005
 See application file for complete search history.

(56) References Cited

U.S. PATENT DOCUMENTS

| 5,995,895 A | 11/1999 | Watt et al. | |
|---|---|---|---|
| 2004/0264761 A1* | 12/2004 | Mas | G06T 7/593 382/154 |
| 2013/0205733 A1* | 8/2013 | Peters | A01D 41/127 56/10.1 |
| 2015/0230403 A1* | 8/2015 | Jung | A01C 23/047 701/50 |
| 2016/0084813 A1* | 3/2016 | Anderson | G01N 33/025 702/5 |
| 2016/0309656 A1* | 10/2016 | Wilken | A01D 41/127 |

FOREIGN PATENT DOCUMENTS

| EP | 2586286 A1 | 5/2013 |
|---|---|---|
| EP | 3000305 A1 | 3/2016 |
| EP | 3085221 A1 | 10/2016 |

OTHER PUBLICATIONS

European Search Report issued in counterpart European Patent Application No. 19169562.6, dated Sep. 24, 2019 (8 pages).

* cited by examiner

*Primary Examiner* — Jess Whittington
(74) *Attorney, Agent, or Firm* — Joseph R. Kelly; Kelly, Holt & Christenson PLLC

(57) ABSTRACT

An agricultural harvester includes a plurality of controllable subsystems and a forward-looking crop sensor that detects a characteristic of the crop in front of the harvester. The forward-looking sensor generates a first sensor signal indicative of the detected characteristic. The harvester further includes a component sensor that detects a characteristic of a component of the agricultural harvesting machine and generates a second sensor signal indicative of the detected characteristic. Adaptation logic receives the first and second sensor signals and determines a sensor conversion factor intermittently during operation of the agricultural harvester. Recommendation logic receives the conversion factor and generates a recommendation to change operation of a controllable subsystem, based in part on the calculated conversion factor and a value received from the forward-looking crop sensor. A control system controls the controllable subsystem based on the generated recommendation.

20 Claims, 11 Drawing Sheets

US 11,240,959 B2

ADAPTIVE FORWARD-LOOKING BIOMASS CONVERSION AND MACHINE CONTROL DURING CROP HARVESTING OPERATIONS

FIELD OF THE DESCRIPTION

This description relates to agricultural harvesters. More particularly it relates to the controlling of the agricultural harvester based on predicted changing conditions in an area of operation.

BACKGROUND

Agricultural harvesters, such as combines or windrowers, travel through fields of agricultural crop harvesting the crop. In one common arrangement, agricultural harvesting heads extend forward from the agricultural harvester to engage the plant stalks, sever them, and carry the severed crop into the body of the agricultural harvester, itself, for processing.

In agricultural harvesters, the throughput (rate of crop moving through the machine) is dependent on the forward ground speed of the harvester and the density of the crop being harvested. Some machine settings can be set, assuming a throughput, and machine speed is then varied, as the operator observes differences in crop density, to maintain the desired throughput.

Some current systems automatically adjust the forward ground speed of the harvester in an attempt to maintain a desired crop throughput. This can be done by attempting to identify the crop density based on a sensor input, such as from a sensor that senses a variable indicative of crop density. One such sensor is a sensor that senses rotor pressure.

The discussion above is merely provided for general background information and is not intended to be used as an aid in determining the scope of the claimed subject matter.

SUMMARY

An agricultural harvester includes a plurality of controllable subsystems and a forward-looking crop sensor that detects a characteristic of the crop in front of the harvester. The forward-looking sensor generates a first sensor signal indicative of the detected characteristic. The harvester further includes a component sensor that detects a characteristic of a component of the agricultural harvesting machine and generates a second sensor signal indicative of the detected characteristic. Adaptation logic receives the first and second sensor signals and determines a sensor conversion factor intermittently during operation of the agricultural harvester. Recommendation logic receives the conversion factor and generates a recommendation to change operation of a controllable subsystem, based in part on the calculated conversion factor and a value received from the forward-looking crop sensor. A control system controls the controllable subsystem based on the generated recommendation.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
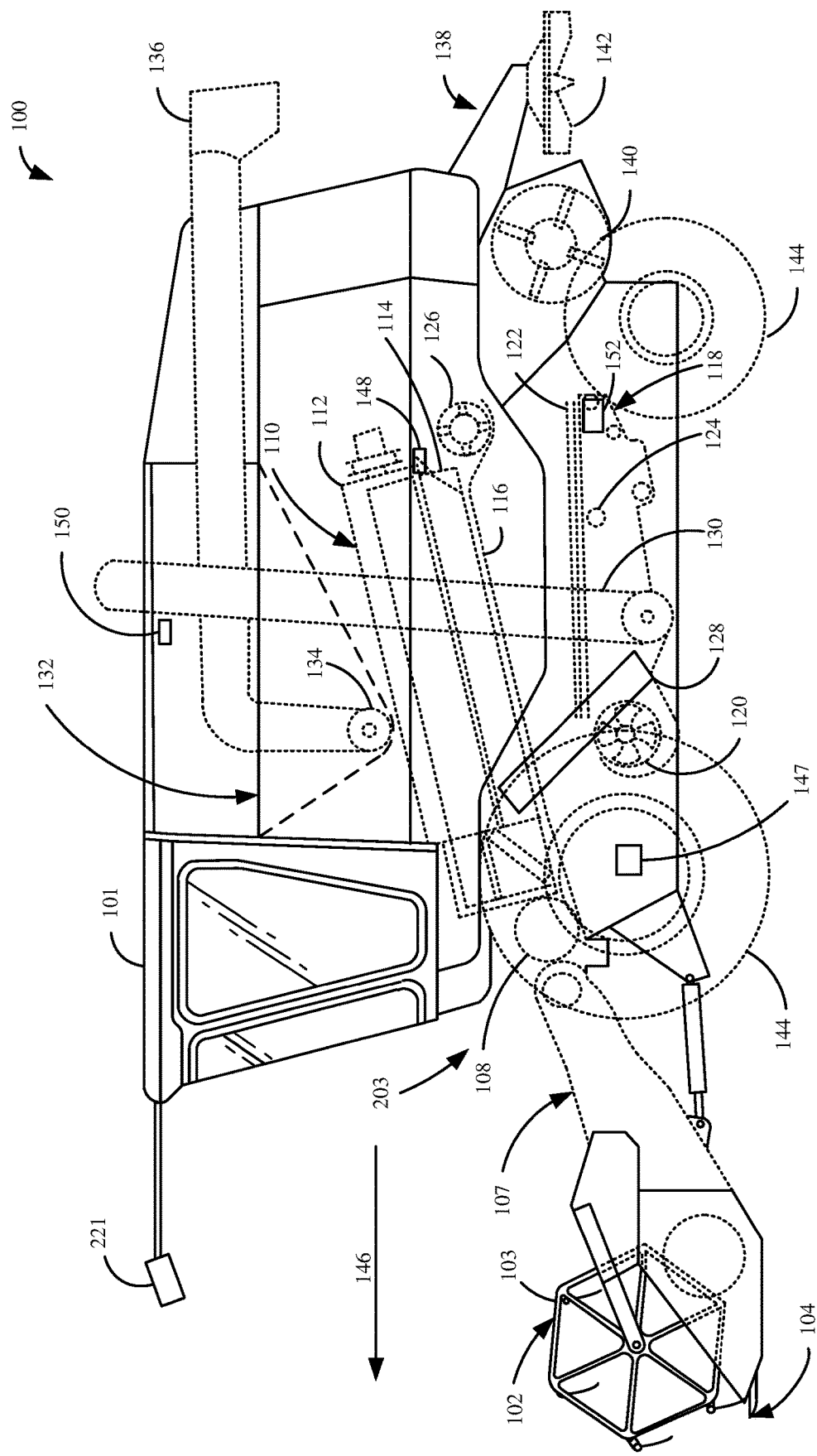
FIG. 1 illustrates a partial pictorial, partial schematic view of an example mobile harvesting machine.

FIG. 1 is a partial pictorial, partial schematic, illustration of an agricultural machine 100, in an example where machine 100 is a combine harvester (also referred to as machine 100 or combine 100). It can be seen in FIG. 1 that machine 100 illustratively includes an operator compartment 101, which can have a variety of different operator interface mechanisms, for controlling machine 100. In one example, machine 100 is fully autonomous and may not have an operator compartment. Machine 100 can include a front end equipment subsystem that can include header 102, and a cutter generally indicated at 104. It can also include a feeder house 107, a feed accelerator 108, and a threshing subsystem generally indicated at 110. Threshing subsystem 110 illustratively includes a threshing rotor 112 and a set of concaves 114. Further, machine 100 can include a separator subsystem 116 that includes a separator rotor. Machine 100 can include a cleaning subsystem (or cleaning shoe) 118 that, itself, can include a cleaning fan 120, chaffer 122 and sieve 124. The material handling subsystem 113 in machine 100 can include (in addition to a feeder house 107 and feed accelerator 108) discharge beater 126, tailings elevator 128, clean grain elevator 130 (that moves clean grain into clean grain tank 132) as well as unloading auger 134 and spout 136. Machine 100 can further include a residue subsystem 138 that can include chopper 140 and spreader 142. Machine 100 can also have a propulsion subsystem that includes an engine that drives ground engaging wheels 144 or tracks, etc. It will be noted that machine 100 may also have more than one of any of the subsystems mentioned above (such as left and right cleaning shoes, separators, etc.).

In operation, and by way of overview, machine 100 illustratively moves through a field in the direction indicated by arrow 146. A forward-looking sensor 221 is mounted on the front of machine 100 and senses characteristics of crop in front of the machine 100. In one example, sensor 221 is an image capture sensor that captures an image of an area forward of header 102. The image can be used to identify a volume of crop to be engaged by header 102. This can be used to automatically increase or decrease the ground speed of harvester 100 to maintain a desired crop throughput. This is described in greater detail below. As machine 100 moves, header 102 engages the crop to be harvested and gathers it toward cutter 104. After it is cut, the crop can be engaged by reel 103 that moves the crop to feeding tracks, which in turn, move the crop to the center of the head 102 and then into feeder house 107 toward feed accelerator 108, which accelerates the crop into threshing subsystem 110. The crop is threshed by rotor 112 rotating the crop against concaves 114. The hydraulic pressure needed to power rotor 112 is sensed and can be used to determine a biomass of the crop being threshed. This is also described in more detail below.

The threshed crop is moved by a separator rotor in separator 116 where some of the residue is moved by discharge beater 126 toward the residue subsystem 138. It can be chopped by residue chopper 140 and spread on the field by spreader 142. In other implementations, the residue is simply dropped in a windrow, instead of being chopped and spread.

Grain falls to cleaning shoe (or cleaning subsystem) 118. Chaffer 122 separates some of the larger material from the grain, and sieve 124 separates some of the finer material from the clean grain. Clean grain falls to an auger in clean grain elevator 130, which moves the clean grain upward and deposits it in clean grain tank 132. Residue can be removed from the cleaning shoe 118 by airflow generated by cleaning fan 120. That residue can also be moved rearwardly in machine 100 toward the residue handling subsystem 138.

Tailings can be moved by tailings elevator 128 back to threshing subsystem 110 where they can be re-threshed. Alternatively, the tailings can also be passed to a separate re-threshing mechanism (also using a tailings elevator or another transport mechanism) where they can be re-threshed as well.

FIG. 1 also shows that, in one example, machine 100 can include ground speed sensor 147, one or more separator loss sensors 148, a clean grain camera 150, and one or more cleaning shoe loss sensors 152. Ground speed sensor 147 illustratively senses the travel speed (or ground speed) of machine 100 over the ground. This can be done by sensing the speed of rotation of the wheels, the drive shaft, the axle, or other components. The travel speed can also be sensed by a positioning system, such as a global positioning system (GPS), a dead reckoning system, a LORAN system, or a wide variety of other systems or sensors that provide an indication of position, from which travel speed can be measured.

Cleaning shoe loss sensors 152 illustratively provide an output signal indicative of the quantity of grain loss by both the right and left sides of the cleaning shoe 118. In one example, sensors 152 are strike sensors which count grain strikes per unit of time (or per unit of distance traveled) to provide an indication of the cleaning shoe grain loss. The strike sensors for the right and left sides of the cleaning shoe can provide individual signals, or a combined or aggregated signal. It will be noted that sensors 152 can comprise only a single sensor as well, instead of separate sensors for each shoe.

Separator loss sensor 148 provides a signal indicative of grain loss in the left and right separators. The sensors associated with the left and right separators can provide separate grain loss signals or a combined or aggregate signal. This can be done using a wide variety of different types of sensors as well. It will be noted that separator loss sensors 148 may also comprise only a single sensor, instead of separate left and right sensors.

In one example, various machine settings can be set and/or controlled to achieve a desired performance. The settings can include such things as concave clearance, rotor speed, sieve and chaffer settings, cleaning fan speed, among others. These settings can illustratively be set or controlled based on expected crop throughput (e.g., the amount of crop processed by harvester 100 per unit of time). Thus, if the mass of the crop varies spatially in the field, and the ground speed of harvester 100 remains constant, then the throughput will change with crop mass. Some current systems have attempted to sense throughput by sensing the hydraulic pressure needed to power the rotor 112 and then change the ground speed in an attempt to maintain the desired throughput. However, by the time the rotor pressure is sensed, the harvester 100 is already processing that crop material so controlling the ground speed of harvester 100 based on the rotor pressure is reactive and may be less effective than desired in maintaining the throughput. Thus, other systems use a forward-looking sensor 221 to estimate the height of the crop in a given area and to further estimate a volume of the crop that is about to be processed. These systems then attempt to convert that volume into a biomass metric indicative of the biomass of the crop that is about to be engaged. The machine speed can then be controlled based on the estimated biomass to maintain the desired throughput. However, converting a volume of crop material into an estimated biomass means that a density of the crop must be used as a conversion factor. The current systems simply estimate a conversion factor or receive one as an operator input. Density of the crop, however, can vary significantly across a field. Thus, the present description proceeds with respect to initially estimating the conversion factor, and then using a sensed variable indicative of a measure of actual crop density to continually or intermittently adapt the conversion factor.

Figure 2:
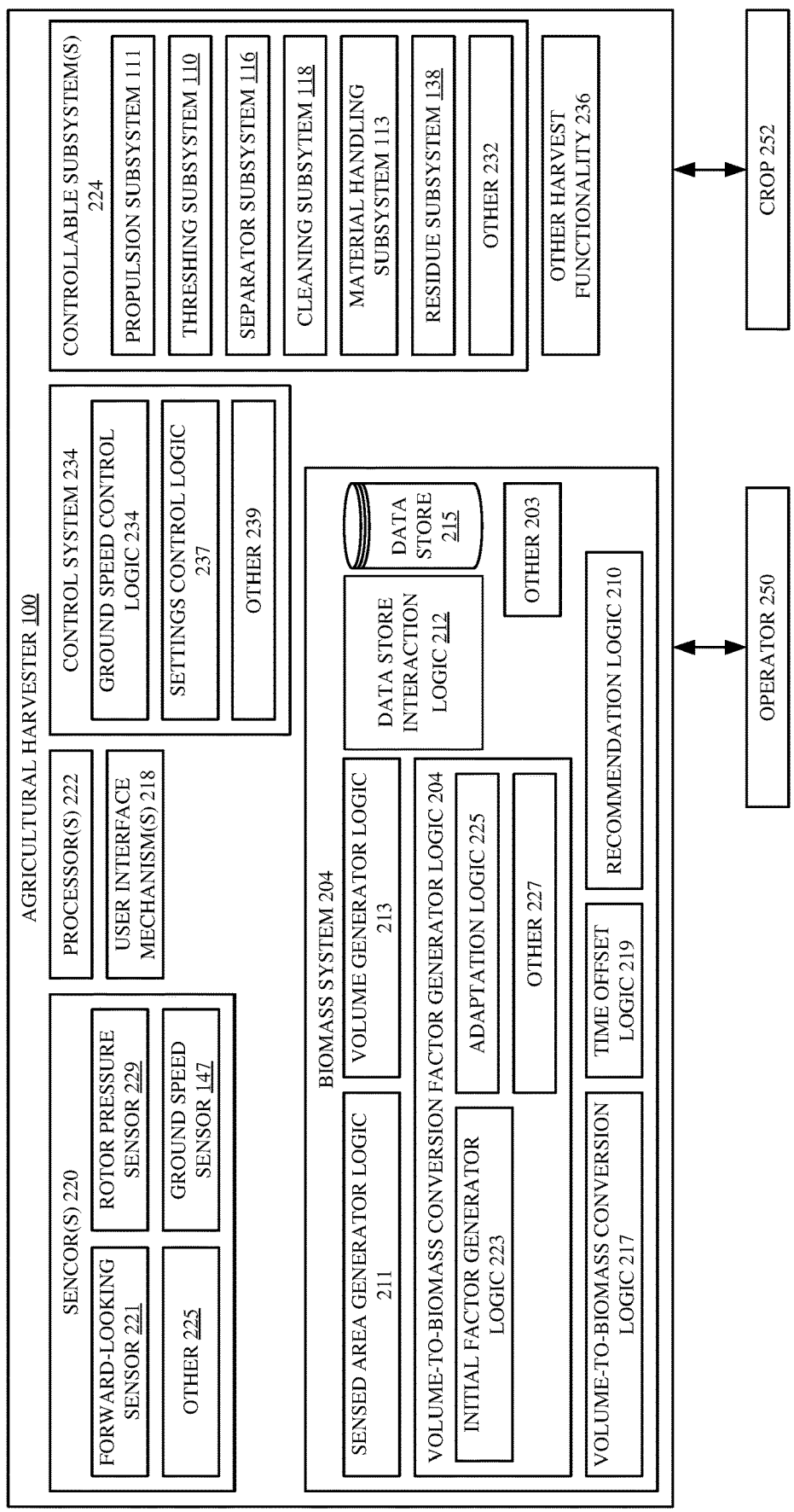
FIG. 2 illustrates a block diagram showing one example of portions of the harvesting machine in more detail.

FIG. 2 is a block diagram of one example of a harvesting environment 200 that includes agricultural harvester 100, operator 250 and crop 252. Agricultural harvester 100 is operated by operator 250 and harvests crop 252. Agricultural harvester 100 includes a biomass system 204, user interface mechanism(s) 218, sensors 220, one or more processor(s) 222, controllable subsystems 224, a control system 234 and can include other components as indicated by block 236.

It is through user interface mechanism(s) 218 that an operator 250 operates and communicates with agricultural harvester 100. User interface mechanism(s) 218 can include mechanical controls (e.g., steering wheel, levers or pedals), electronic controls (e.g., displays, joysticks, and touchscreens), haptic and audio devices, etc. In one example, machine 100 is autonomous and may have fewer or no user interface mechanism(s) 218.

Agricultural harvester 100 can include several different sensors 220 including forward-looking sensor 221, rotor sensor 229, ground speed sensor 147 and can include other sensors as well, as indicated by block 220. Forward looking sensor 221 can be a variety of different sensors, including but not limited to, a camera, stereo cameras, a laser-based sensor, a lidar, a radar, an ultrasound based sensor, etc. In one example, forward looking sensor 221 is a laser system or stereo camera system and determines an average crop height across an area of interest. The area of interest is illustratively known and positioned a known distance in front of harvester 100. For instance, the area of interest can be centered a known distance in front of the harvester 100, as wide as the harvester head and 0.25-1 m deep. Rotor sensor 229 can be a hydraulic pressure sensor, indicative of the hydraulic pressure being exerted to drive the threshing rotor. This sensor can also be a torque sensor sensing the torque required to drive the rotor which is another indication of the biomass load currently being processed by the rotor.

Agricultural harvester 100 can include controllable subsystems 224. Some examples of controllable subsystems 224 were explained above and include steering/propulsion systems 111, threshing subsystem 110, separator subsystem 116, cleaning subsystem 118, material handling system 113, residue system 138, header subsystems 228, and other components as indicated by block 232. The actuators that control the functions of controllable subsystems 224 may be controlled by signals generated from control system 234.

Control system 234 includes ground speed control logic 235, settings control logic 237 and can include other components as indicated by block 239. Ground speed control logic 235 controls the speed at which agricultural harvester 100 travels. Settings control logic 237 can control various settings of agricultural harvester 100, for instance, thresher drum/rotor speed, conveyer speed, auger speed, concave clearance, sieve and chaffer settings, cleaning fan speed, etc.

Figure 3A:
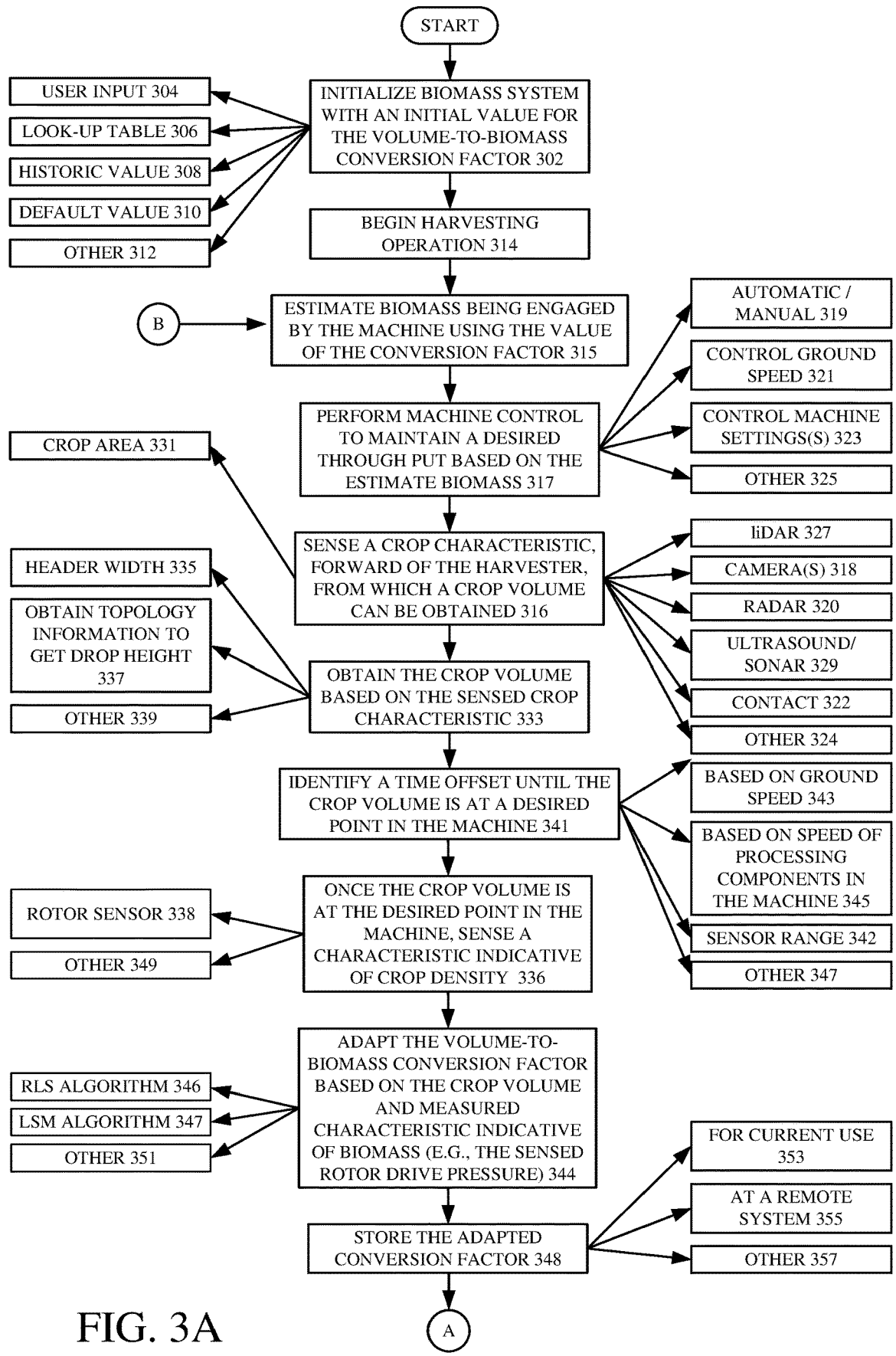
FIG. 3 illustrates a flow diagram showing one operation of a biomass prediction and control system.
Figure 3B:
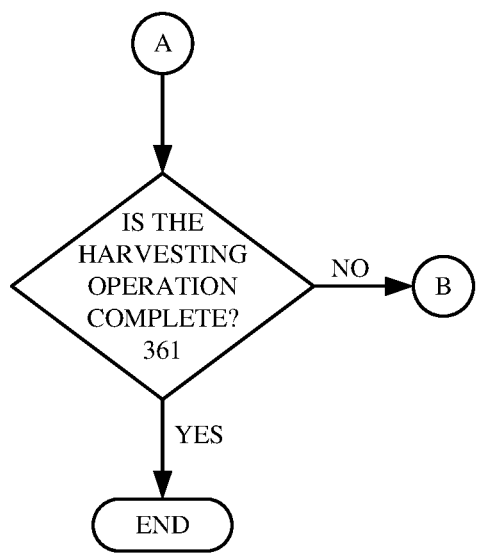

Biomass system 204 includes various logic components whose functions are described in further detail in FIG. 3. Briefly, sensed area generator logic 211 determines the area sensed by forward-looking sensor 221. Volume generator logic 213 uses the area sensed and determines a crop volume or characteristic forward of the agricultural harvester 100. Volume to biomass conversion logic 217 receives a crop volume or characteristic forward of the agricultural harvester 100 and a conversion factor (generated by volume to biomass conversion factor generator logic 221) to estimate a biomass of the crop in the sensed volume. Volume to biomass conversion factor generator logic 221 comprises initial factor generator logic 223, adaptation logic 225 and can include other components as well, as indicated by block 227. Initial factor generator logic 223 generates an initial volume to biomass conversion factor and adaptation logic 225 adapts it based on a sensed variable indicative of actual biomass. Time offset logic 219 determines the time offset between a crop being sensed and when it will be processed by the agricultural harvester 100. Datastore interaction logic 212 stores and retrieves information from data store 215. The functions of logic components of biomass system 204 can be executed by processor(s) 222.

FIG. 3 illustrates a flow chart of operation of biomass system 204. Operation begins at block 302 where the biomass system is initialized with an initial input. This input is generated by initial factor generator logic 223 and is indicative of an initial conversion factor that is used to convert between a sensed crop volume/characteristic forward of the harvester 100 and a biomass that will be processed by the harvester when that sensed crop is engaged by the harvester 100. The initial conversion factor can be generated by receiving it in a number of ways as indicated by blocks 304 to 312. Block 304 indicates that one way of receiving the initial conversion factor is by an operator 250 manually entering or selecting a conversion factor. Block 306 indicates that another way of receiving the initial conversion factor is by using a lookup table based on various factors (e.g., climate, type of agricultural product, etc.). Block 308 indicates that another way of receiving the initial conversion factor is by using a historical value (e.g., the average conversion factor for the same field from the previous year, conversion factor recently used or calculated in adjacent field, etc.). Block 310 indicates another way of receiving the initial conversion factor is by obtaining a default value that may be useful in a wide variety of scenarios. The initial conversion is then modified or adapted by adaptation logic 225 to be an adapted conversion factor shortly after harvesting begins, based on sensor values. This is described in greater detail below.

Operation continues at block 314 where crop harvesting begins.

At block 315, volume to biomass conversion logic 217 estimates the biomass being engaged by the agricultural harvester 100 using the value of the conversion factor. For instance, the volume of crop sensed based on the signal from forward looking sensor 221 has the volume to biomass conversion factor applied to it to obtain an indication of biomass in the volume. The value of the conversion factor is determined at block 302, before it is adapted, to be the initial conversion factor. As discussed below, the value of the conversion factor can be initially determined at block 344 during the adaptation process.

At block 317, recommendation logic 210 generates a recommendation to maintain a desired throughput based on the estimated biomass. The recommendation can be performed either automatically by control system 234 or manually by the operator 251. Some recommendations that may be generated include changing the ground speed of harvester 100, as indicated by block 321, changing machine settings such as concave settings, sieve and chaffer settings, cleaning fan speed, threshing rotor speed, conveyer/feed speed or cutter speed, as indicated by block 323. Of course, other settings may be changed as well, as indicated by block 325.

As discussed above, during crop harvest, a characteristic of the crop forward of the harvester 100 is sensed by forward-looking sensor 221, from which a crop volume can be obtained, as indicated by block 316. The sensor 221 generates a signal that correlates to a characteristic of the crop. This characteristic may be sensed by a variety of different types of sensors. Block 327 indicates that the characteristic of the crop can be sensed with one or more laser based sensors (e.g. liDAR). Block 318 indicates that the characteristic of the crop can be sensed with one or more optical devices (e.g., a single camera or a stereo camera system). Block 320 indicates the characteristic of the crop can be sensed by radar, lidar or similar systems. Block 329 indicates a characteristic of the crop can be sensed by ultrasound, sonar or similar systems. Block 322 indicates that the characteristic of the crop can be sensed by a type of contact sensor. The characteristic of the crop can be sensed in other ways as well, as indicated by block 324.

Operation continues at block 333 where the volume is determined based on the sense crop characteristic. Volume generator logic 213 receives the sensor signals indicative of the characteristic of the crop and determines a crop volume in the region forward of harvester 100. Crop volume can be determined by first identifying an area (with sensed area generator logic 211) ahead of the harvester 100 that is being sensed. The area can be calculated by taking the width of the header as indicated by block 335 and multiplying it by a depth of view of sensor 221 (e.g., the distance in the forward direction forward of the harvester 100, that is being sensed). This area can then be multiplied by a height of the crop in that area to obtain a volume of crop being sensed. In one example, sensor 221 senses a height of the crop canopy (the top of the crop). Volume generator logic 223 can then subtract the crop height from an elevation of the ground on which the crop is growing. This elevation can be sensed or obtained from a topographical map, or otherwise, as indicated by block 337. For instance, the crop may measure 5-feet-high by the sensor. However, it may be determined that this crop is on a portion of land that is elevated 2 feet higher than the sensor (e.g., than the current position of machine 100) so the real height of the crop in the sensed area is 3-feet-high. This can be multiplied by the area to obtain crop volume at a region forward of machine 100. Crop volume can be determined in other ways as well, as indicated by block 339.

At block 341, time offset logic 218 identifies a time offset indicating how long it will take the crop volume to reach a desired point in the agricultural harvester 100 (e.g., the thresher). The time offset can be identified based on a number of different factors. Block 343 indicates the time offset can be influenced by the ground speed of agricultural harvester 100. Block 345 indicates the time offset can be influenced by the speed of processing components that move the crop to the desired point in the harvester 100 (e.g., conveyors, augers, etc.). Block 342 indicates that the time offset can be influenced by the sensor range (e.g., how far in front of the machine 100 is the crop volume). For example, a first sensor detects a crop characteristic a short distance from the harvester 100 will have a shorter time offset than a second sensor that detects a crop characteristic out a farther distance from harvester 100 than the first sensor. The time offset can be calculated in other ways as well, as indicated by block 347.

Operation further continues at block 336 where once the crop volume is at the desired point in the machine 100 a characteristic indicative of biomass is detected by sensor(s) 220. In one example, rotor drive pressure is sensed with rotor sensor 229, as indicated by block 338. Rotor drive pressure or torque can be used as an indication of the biomass being processed through the thresher in machine 100, as it is the pressure or torque used to maintain the threshing rotor at a set speed. This correlates (along with the concave settings) with the biomass moving through the thresher in the machine at that time. The characteristic indicative of biomass can be sensed in other ways as well, as indicated by block 349.

At block 344, adaptation logic 225 adapts the volume to biomass conversion factor based on the sensed crop characteristic (from block 316), time offset (from block 341) and sensed characteristic indicative of biomass (from block 336). For instance, it determines the actual biomass (detected based on, e.g., rotor pressure) compared to the biomass estimated using the current volume to biomass conversion factor. It then adapts the volume to biomass conversion factor accordingly. One way in which adaptation logic 225 calculates the biomass conversion factor is to use recursive least-squares adaptive filtering, as indicated by block 346. Another way in which adaptation logic 225 calculates the biomass conversion factor is to use lease square mean filtering, as indicated by block 346. Adaptation logic 225 can adapt the conversion factor in other ways as well as indicated by block 351.

At block 348, data store interaction logic 212 stores the volume to biomass conversion factor in the data store 215 based on the operating factors that were present at the time the conversion factor was calculated. For example, a map of an operating area can be generated with points on the map having corresponding biomass conversion factor values calculated at these points. This mapping is indicated by block 349. One example of mapping is described in detail below with respect to FIG. 4C. Block 353 indicates that the adapted conversion factor can be stored for current use. As an example, the volume to biomass conversion factor can be stored in data store 215 with a correlated forward-looking sensor value. In this way, when a current forward-looking sensor value is similar to a previous value, adaptation logic 225 can determine that the volume to biomass conversion factor will also be similar. Block 355 indicates that the adapted conversion factor can be stored at a remote system. Block 357 indicates that the adapted conversion factor can be stored in other ways as well.

Block 361 indicates that if the harvesting operation is complete the process ends. However, if the harvesting operation is not complete, then the process continues at block 315 where the biomass to be engaged is determined using the adapted conversion factor and machine control is performed based on the biomass. In this way, biomass system 204 continually adjusts to changing conditions throughout the field.

Figure 4A:
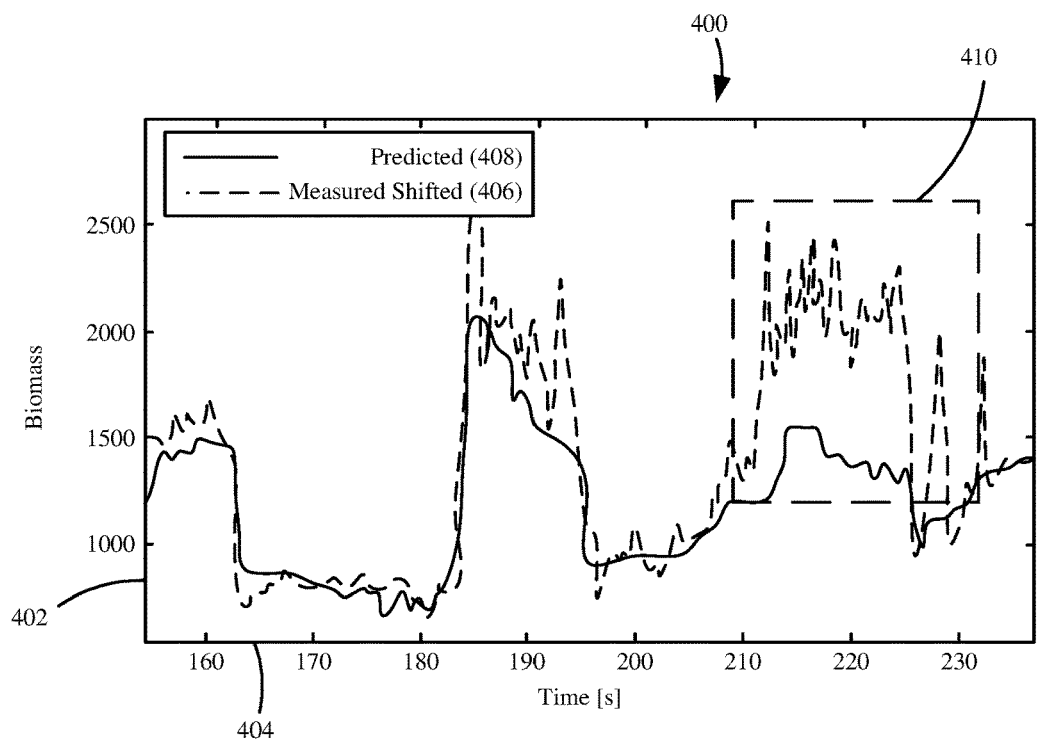
FIGS. 4A-4B illustrate example charts of predicted biomasses versus actual measured biomasses.

FIG. 4A illustrates a chart showing a predicted biomass (represented by thresher rotor pressure) versus an actual biomass over time. Axis 402 represents a value indicative of biomass (e.g., rotor pressure) and axis 404 represents time. Line 406 represents an actual measured biomass (e.g., rotor pressure). Line 408 represents a predicted biomass (e.g., rotor pressure). The predicted pressure in FIG. 4A utilizes a fixed conversion factor between a sensed crop characteristic (e.g., crop volume) and sensed internal component characteristic (e.g., rotor pressure) to determine the biomass. As illustrated, a fixed conversion factor does a moderate job of predicting an actual measured biomass. However, there is an area of deviance 410. In this example, area of deviance 410 represents a time when the agricultural harvester was processing "down crop," or crop that is lying down. Since the conversion factor was between crop volume and biomass, crop that is lying down will make volume-to-biomass logic 219 predict that there is less biomass in this volume, when in reality, there is the same amount, but is lower to the ground (so it has a smaller volume and is more dense).

Figure 4B:
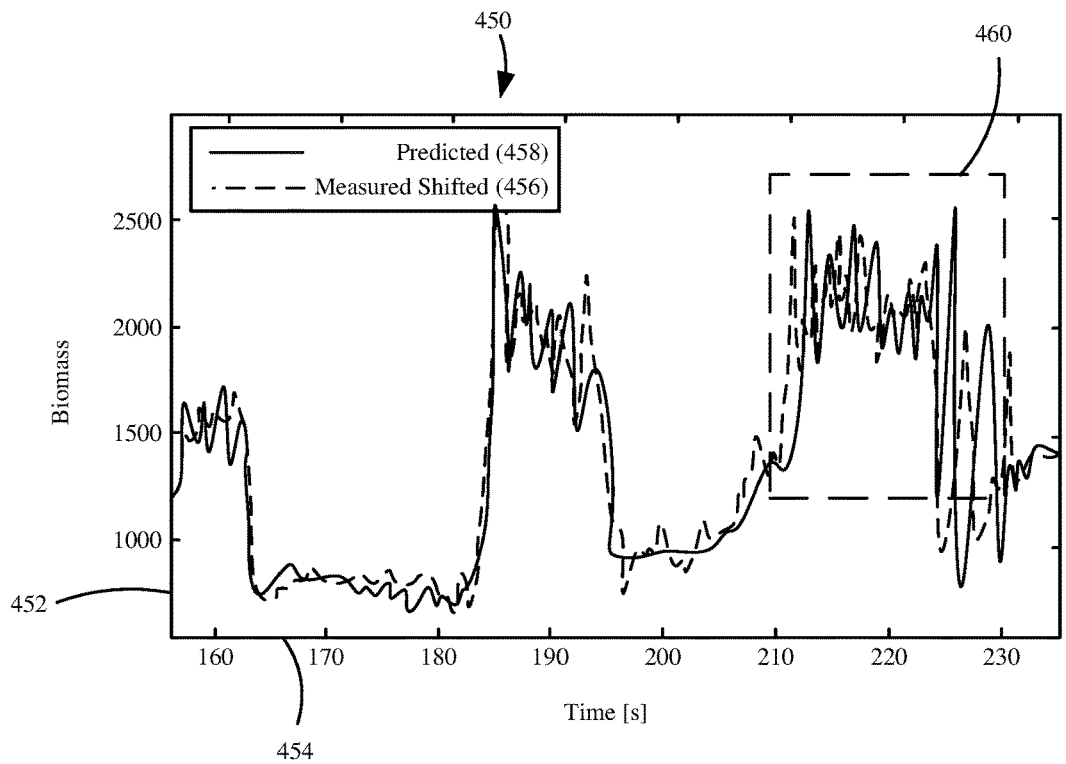

FIG. 4B illustrates a chart showing a predicted biomass versus an actual biomass as it varies over time. Axis 452 represents a signal indicative of biomass and axis 454 represents time. Line 456 represents an actual measured biomass (e.g., rotor pressure) and line 458 represents a predicted biomass (e.g., rotor pressure). As illustrated, the predictions are very accurate compared to those of FIG. 4A. The difference between FIGS. 4A and 4B is that FIG. 4B utilizes the prediction method of FIG. 3. Accordingly, when the agricultural harvester is driving through an area of the down crop the forward-looking sensor 221 may detect the crop is low but then the rotor pressure sensor 229 detects that the biomass is still high. Adaptation logic 225 using this data and determines a new conversion factor "on the fly" that is better able to make a biomass prediction as shown in areas 460.

Figure 4C:
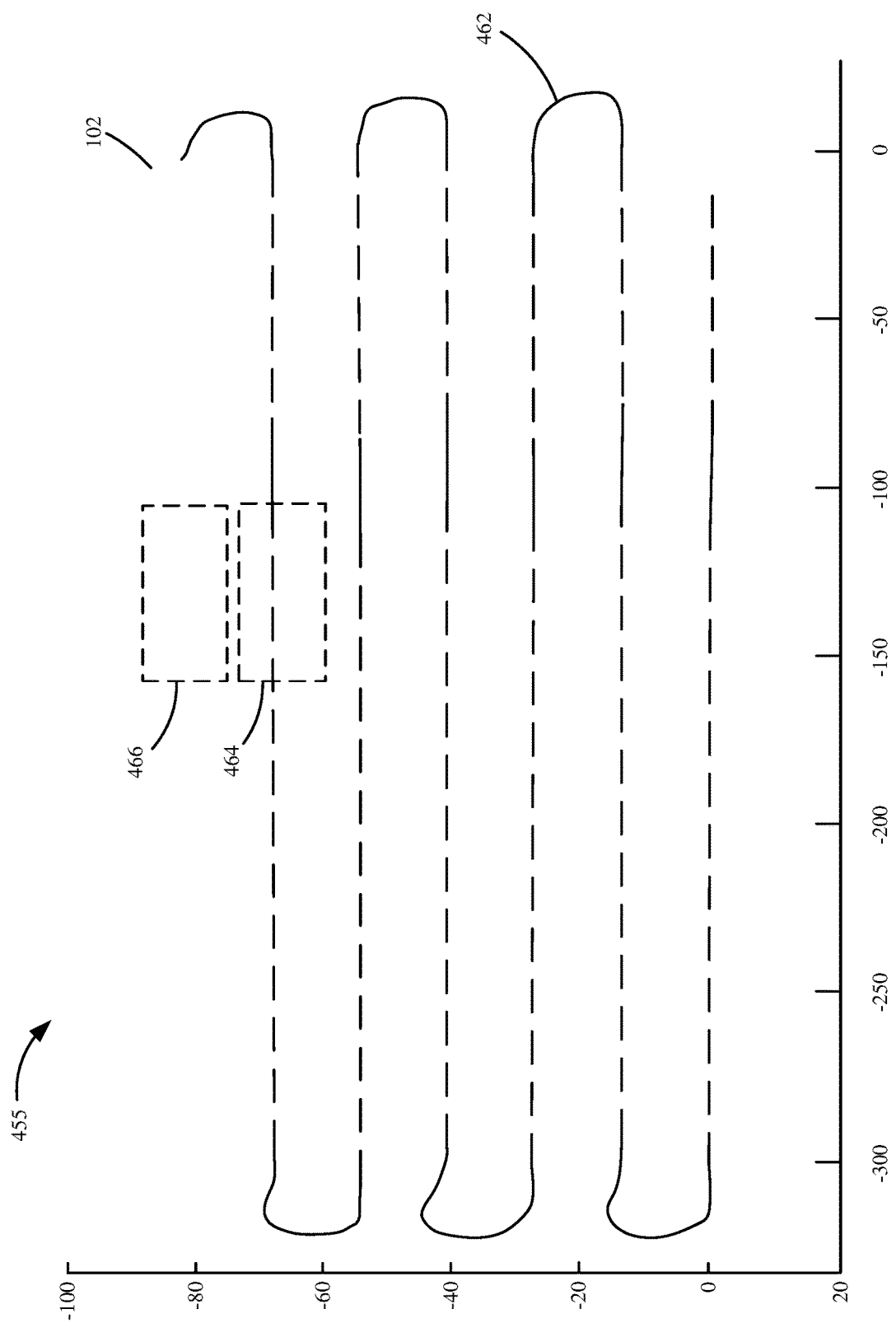
FIG. 4C illustrates an example map of data stored by a biomass system.

FIG. 4C illustrates a map of a working field 455. Path 462 is the path taken by harvester 100 as it navigates the field 455. At given intervals during its travel, conversion factor adaptation is repeated and data is stored (see block 348 of FIG. 3). This data can correspond to the location in which the adapted conversion factor was captured/calculated. For example, area 464 corresponds to the data 460 in FIG. 4B which indicated an area of down crop. Mapping the data can be useful in predicting future conditions of a field. For example, when area 460 has been identified as being down crop, (e.g., when crop volume suddenly decreases but biomass stays similar to previous values) adaptation logic 225 can use this data in adapting the biomass conversion factor of an adjacent area 466.

The present discussion has mentioned processors and servers. In one example, the processors and servers include computer processors with associated memory and timing circuitry, not separately shown. They are functional parts of the systems or devices to which they belong and are activated by and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 5:
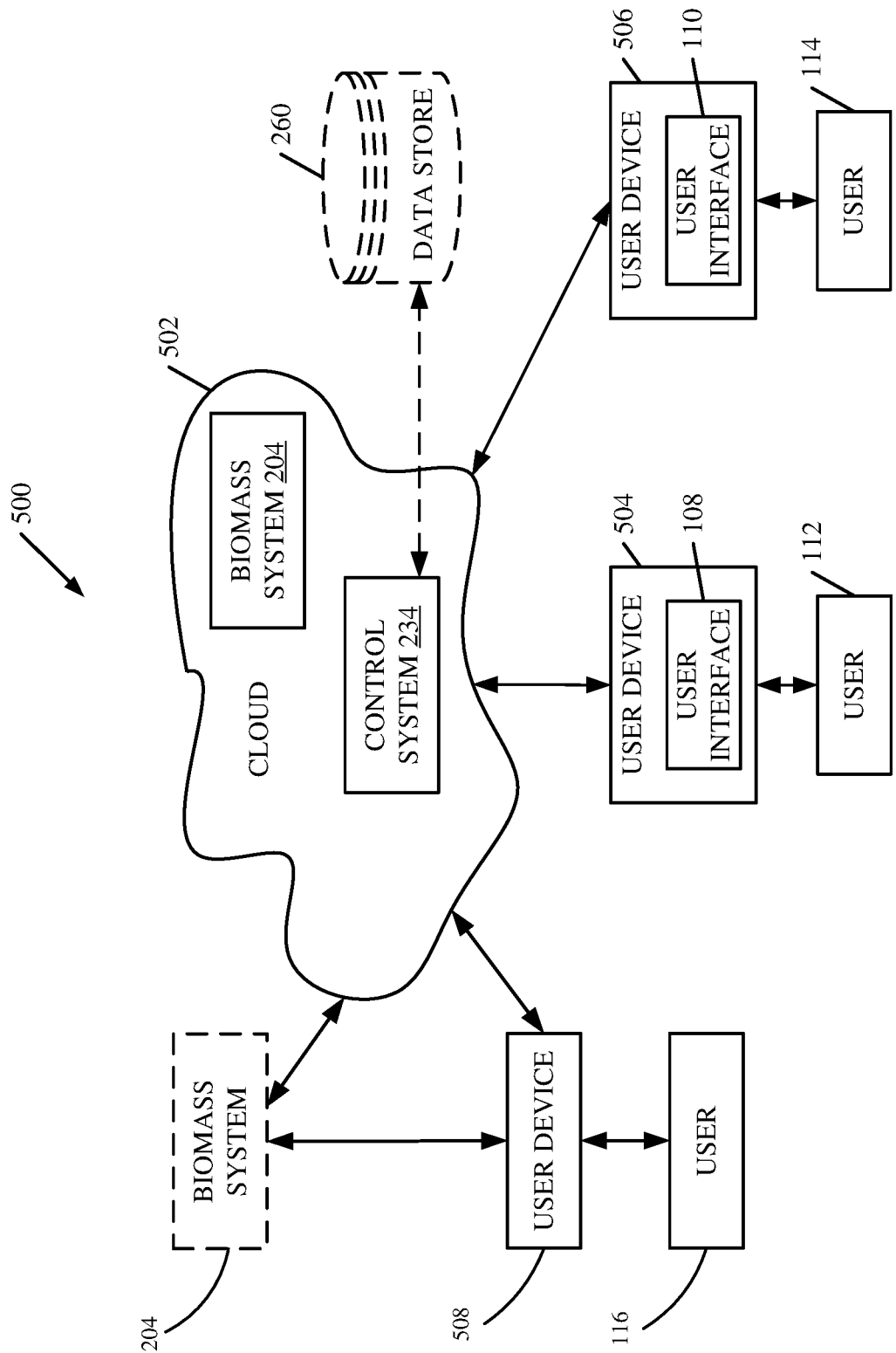
FIG. 5 shows one example of the mobile harvesting machine, as part of a remote server architecture.

FIG. 5 is a block diagram of biomass system 204, shown in FIG. 2, except that it communicates with elements in a remote server architecture 500. In an example, remote server architecture 500 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in FIG. 2 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the examples shown in FIG. 5, some items are similar to those shown in FIG. 2 and they are similarly numbered. FIG. 5 specifically shows that biomass system 204, control system 224 and data store 260 can be located at a remote server location 502. Therefore, work machine 100 accesses those systems through remote server location 502.

FIG. 5 also depicts another example of a remote server architecture. FIG. 5 shows that it is also contemplated that some elements of FIG. 2 are disposed at remote server location 502 while others are not. By way of example, remote systems 112 can be disposed at a location separate from location 502, and accessed through the remote server at location 502. Regardless of where they are located, they can be accessed directly by work machine 100, through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an example, where cell coverage is poor or nonexistent, another work machine (such as a fuel truck) can have an automated information collection system. As the work machine comes close to the fuel truck for fueling, the system automatically collects the information from the work machine using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the work machine until the work machine enters a covered location. The work machine, itself, can then send the information to the main network.

It will also be noted that the elements of FIG. 2, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 6:
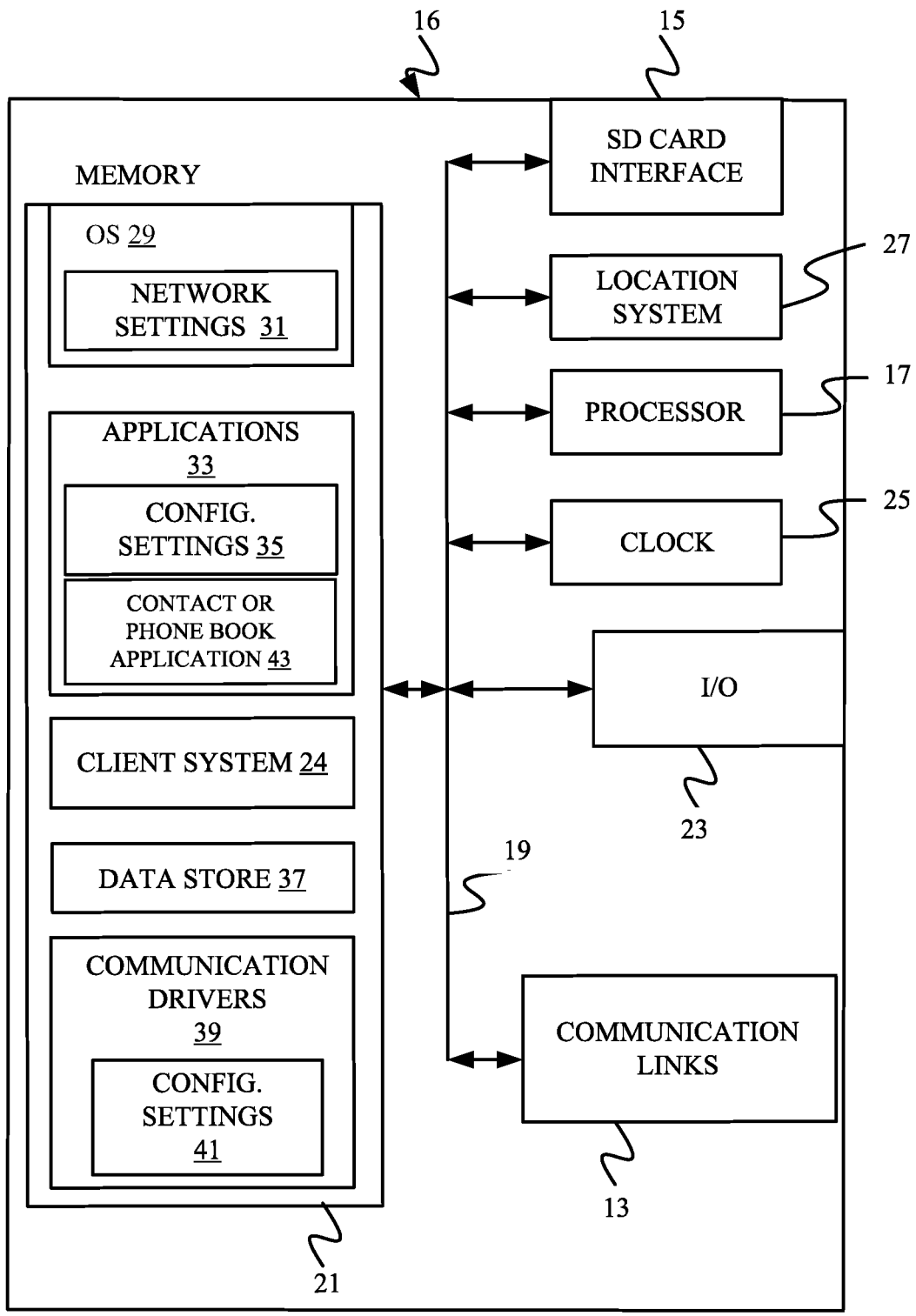
FIGS. 6-8 show examples of mobile devices that can be used with the mobile machine and the remote server architectures shown in the previous figures.
Figure 7:
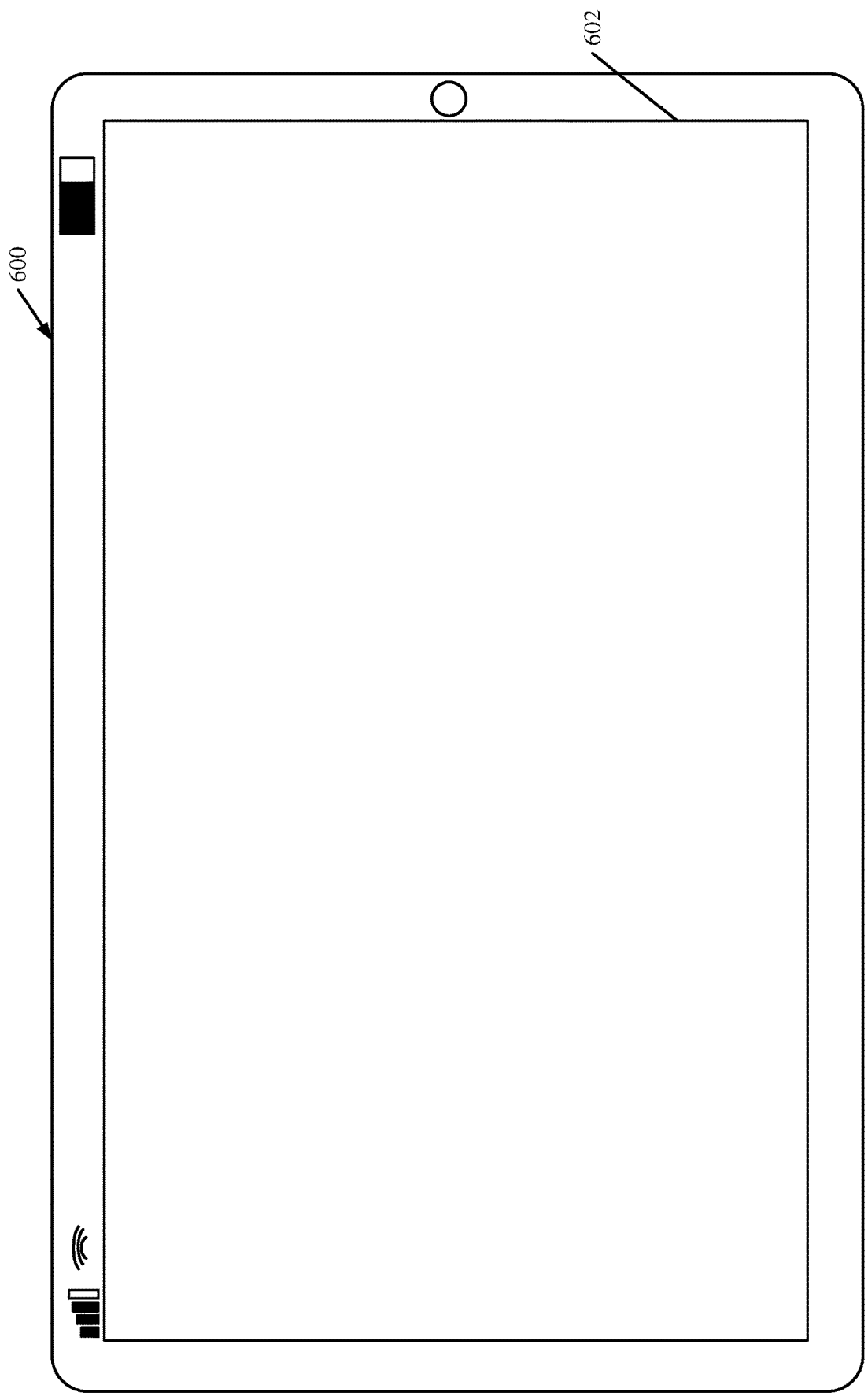
Figure 8:
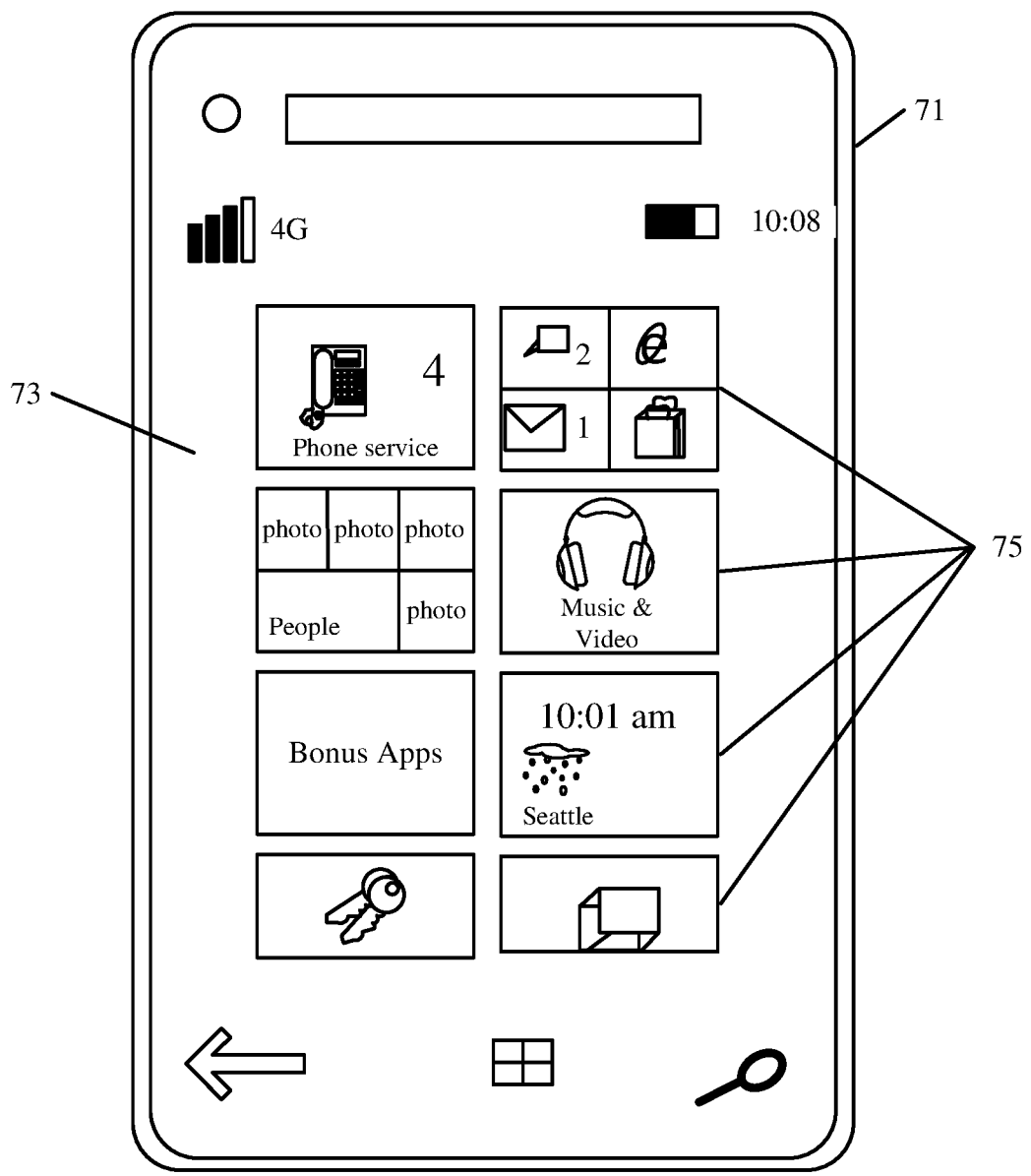

FIG. 6 is a simplified block diagram of one illustrative example of a handheld or mobile computing device that can be used as a user's or client's handheld device 16, in which the present system (or parts of it) can be deployed. For instance, a mobile device can be deployed in the operator compartment of work machine 100 for use in generating, processing, or displaying the stool width and position data. FIGS. 7-8 are examples of handheld or mobile devices.

FIG. 6 provides a general block diagram of the components of a client device 16 that can run some components shown in FIG. 2, that interacts with them, or both. In the device 16, a communications link 13 is provided that allows the handheld device to communicate with other computing devices and under some examples provides a channel for receiving information automatically, such as by scanning. Examples of communications link 13 include allowing communication though one or more communication protocols, such as wireless services used to provide cellular access to a network, as well as protocols that provide local wireless connections to networks.

Under other examples, applications can be received on a removable Secure Digital (SD) card that is connected to an interface 15. Interface 15 and communication links 13 communicate with a processor 17 (which can also embody processor 228 from FIG. 2) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network and applications 33, application configuration settings 35, contact or phonebook application 43, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 7 shows one example in which device 16 is a tablet computer 600. In FIG. 7, computer 600 is shown with user interface display screen 602. Screen 602 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 8 provides an additional example of devices 16 that can be used, although others can be used as well. The phone in FIG. 8 is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 9:
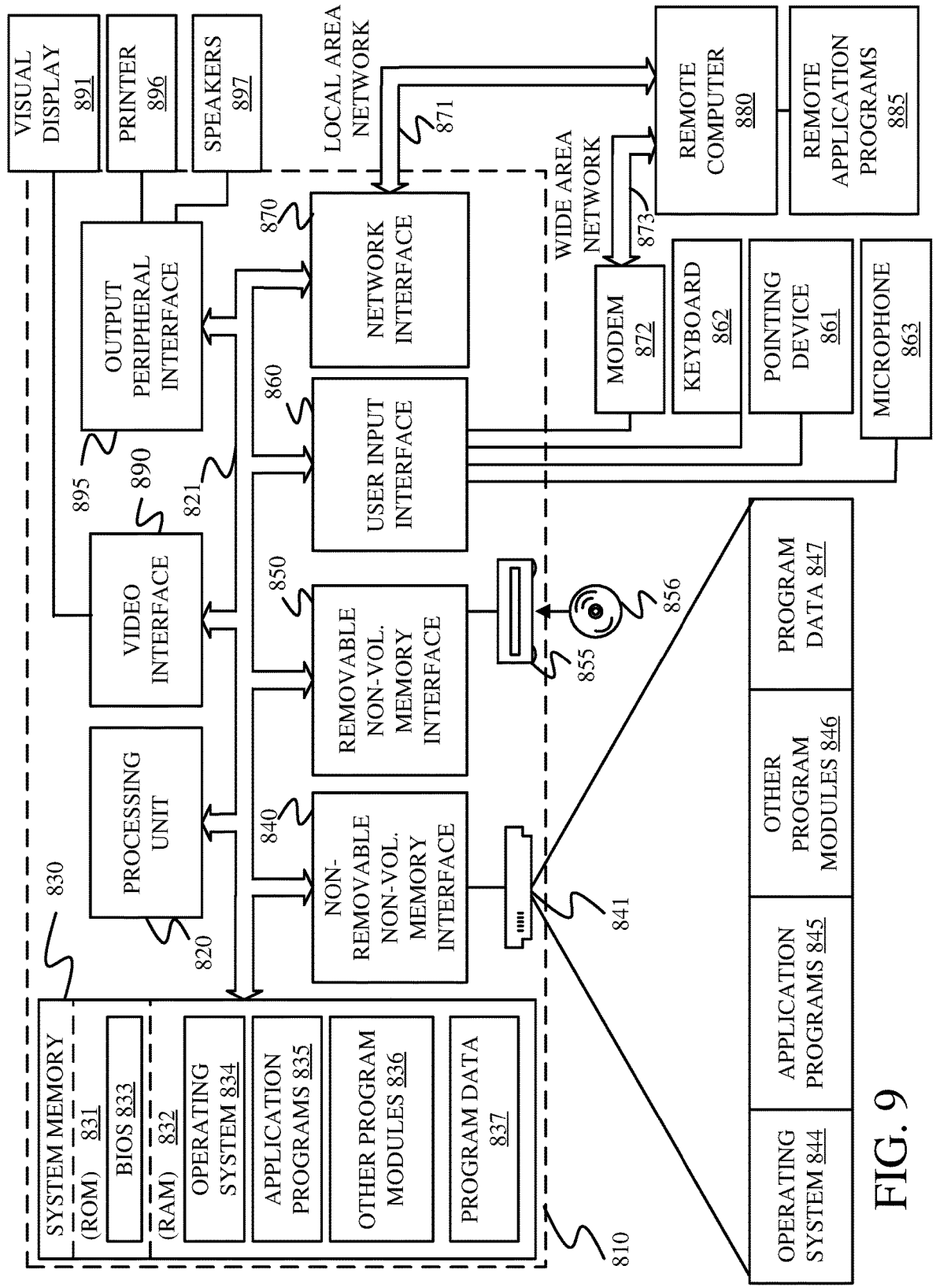
FIG. 9 is a block diagram showing one example of a computing environment that can be used in the mobile machine and/or in the architectures shown in the previous figures.

FIG. 9 is one example of a computing environment in which elements of FIG. 2, or parts of it, (for example) can be deployed. With reference to FIG. 9, an example system for implementing some examples includes a general-purpose computing device in the form of a computer 810. Components of computer 810 may include, but are not limited to, a processing unit 820 (which can comprise processor 228), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIG. 2 can be deployed in corresponding portions of FIG. 9.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 9 illustrates operating system 834, application programs 835, other program modules 836, and program data 837.

The computer 810 may also include other removable/non-removable volatile/nonvolatile computer storage media. By way of example only, FIG. 9 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840 and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 9, provide storage of computer readable instructions, data structures, program modules and other data for the computer 810. In FIG. 9, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 9 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Example 1 is an agricultural harvesting machine, comprising:
  a controllable subsystem;
  a forward-looking crop sensor that detects a characteristic of the crop, in a sensed region, in front of the agricultural harvesting machine in a direction of travel and generates a first sensor signal having a value indicative of the detected characteristic;
  a component sensor that detects a characteristic of a component of the agricultural harvesting machine that is indicative of a biomass being processed by the agricultural harvesting machine, the component sensor generating a second sensor signal indicative of the detected characteristic;
  conversion factor generator logic that receives the first and second sensor signals and adapts a conversion factor intermittently during operation of the agricultural harvesting machine, the conversion factor being used to convert the characteristic of the crop to biomass;
  recommendation logic that receives the conversion factor and generates a recommendation to change operation of the controllable subsystem, based in part on the conversion factor and a value received from the forward-looking crop sensor; and
  a control system that controls the controllable subsystem based on the generated recommendation.

Example 2 is the agricultural harvesting machine of any or all previous examples and further comprising:
  volume generator logic that receives the first sensor signal and generates a crop volume signal indicative of a volume of crop in the sensed region.

Example 3 is the agricultural harvesting machine of any or all previous examples wherein the conversion factor is a volume to biomass conversion factor and wherein the conversion factor generator logic is configured to receive the crop volume signal and the second sensor signal indicative of the biomass being processed when the sensed region is reached by the harvesting machine and adapt the volume to biomass conversion factor based on the crop value signal and the second sensor signal indicative of the biomass.

Example 4 is the agricultural harvesting machine of any or all previous examples wherein the forward-looking crop sensor comprises:
  a crop height detector that detects an average height of the crop over the sensed region in front of the harvester.

Example 5 is the agricultural harvesting machine of any or all previous examples further comprising:
  a threshing rotor;
  an actuator that drives the threshing rotor; and
  wherein the component sensor comprises:
    a rotor actuator sensor that detects a rotor metric indicative of a load on the threshing rotor.

Example 6 is the agricultural harvesting machine of any or all previous examples further comprising:
  time offset logic that determines a time offset between a first time, when the forward-looking crop sensor detects the characteristic of the crop and a second time, when the crop sensed by the forward-looking sensor is being processed by the harvester at a point when the component sensor detects the characteristic of a component.

Example 7 is the agricultural harvesting machine of any or all previous examples wherein the adaption logic correlates the first and second sensor signals based on the time offset.

Example 8 is the agricultural harvesting machine of any or all previous examples wherein the volume generator logic receives a topographic value indicative of an elevation of the sensed region and wherein the volume generator logic determines the crop volume value, based at least in part on the topographic value.

Example 9 is the agricultural harvesting machine of any or all previous examples wherein the adaptation logic utilizes a least mean square algorithm to intermittently calculate the conversion factor.

Example 10 is the agricultural harvesting machine of any or all previous examples wherein the adaptation logic utilizes a recursive lease square error algorithm to intermittently calculate the conversion factor.

Example 11 is the agricultural harvesting machine of any or all previous examples and further comprising:
  a propulsion subsystem, wherein the recommendation logic generates a ground speed recommendation and wherein the control system controls the propulsion subsystem based on the ground speed recommendation.

Example 12 is the agricultural harvesting machine of any or all previous examples further comprising:
  datastore interaction logic that stores the intermittently calculated conversion factor in a datastore.

Example 13 is a method of controlling an agricultural harvesting machine, the method comprising:
  detecting a first crop characteristic value indicative of a first crop volume at a first sensed region in front of the agricultural harvesting machine;
  generating a first crop characteristic signal indicative of the first detected crop characteristic value;
  detecting a first operating characteristic value indicative of an operating characteristic of a working component of the agricultural harvesting machine, the first operating characteristic value being indicative of a biomass being processed by the agricultural harvesting machine;
  generating an operating characteristic signal indicative of the detected first operating characteristic;
  adapting, a conversion factor used to convert between the first crop characteristic value and the first operating characteristic value;
  detecting a second crop characteristic value indicative of a second crop volume at a second sensed region in front of the agricultural harvesting machine;
  generating a second crop characteristic signal indicative of the second detected crop characteristic value;
  predicting, a crop biomass value at the second sensed region based on the conversion factor and the second crop characteristic value;

generating, an operational recommendation based in part on the predicted crop biomass value; and controlling the agricultural harvesting machine based on the operational recommendation.

Example 14 is the method of any or all previous examples further comprising:
determining a time offset that corresponds to a time it takes the sensed second crop volume in front of the agricultural harvesting machine to be processed by the agricultural harvesting machine.

Example 15 is the method of any or all previous examples wherein detecting the first characteristic of the crop comprises detecting an average height of the first crop volume.

Example 16 is the method of any or all previous examples wherein generating the first crop characteristic signal value comprises:
receiving a topographic value corresponding to the first sensed region; and
modifying the average height based on the topographic value.

Example 17 is the method of any or all previous examples wherein adapting the conversion factor comprising:
utilizing a recursive least square error algorithm.

Example 18 is the method of any or all previous examples further comprising:
automatically controlling a speed of the agricultural harvesting machine with a control system based on the generated operational recommendation.

Example 19 is the method of any or all previous examples wherein detecting the operating characteristic of the working component of the agricultural harvesting machine comprises:
detecting a metric of a threshing rotor actuator that actuates a threshing rotor, indicative of a load on the threshing rotor.

Example 20 is a method of controlling an agricultural harvesting machine, the method comprising:
receiving an initial volume to biomass conversion factor;
controlling the agricultural harvesting machine in a field based on the initial volume to biomass conversion factor;
detecting a crop characteristic of a crop in a region of interest forward of the agricultural harvesting machine;
determining a volume of the crop in the region of interest based on the crop characteristic;
calculating a time offset until the crop in the region of interest is processed by the agricultural harvesting machine;
detecting an operating characteristic of the agricultural harvester indicative of a biomass being processed by the agricultural harvester, after the time offset;
adapting the volume to biomass conversion factor based on the crop volume and operating characteristic; and
controlling a speed of the agricultural harvesting machine in a field based on the adapted conversion factor.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. An agricultural harvesting machine comprising:
a controllable subsystem;
a forward-looking crop sensor configured to detect a characteristic of the crop, in sensed regions in front of the agricultural harvesting machine relative to a direction of travel of the agricultural harvesting machine, and generate crop characteristic sensor signals having values indicative of the characteristic of the crop;
a component sensor configured to detect a characteristic of a component of the agricultural harvesting machine that is indicative of a density of crop being processed by the agricultural harvesting machine, and generate component characteristic sensor signals indicative of the characteristic of the component;
conversion factor generator logic configured to:
receive a first crop characteristic sensor signal generated by the forward-looking crop sensor having a first value indicative of the characteristic of crop in a first sensed region in front of the agricultural harvesting machine in a direction of travel;
receive a first component characteristic sensor signal generated by the component sensor having a value indicative of a density of the crop from the first sensed region; and
adapt a conversion factor used to convert the values indicative of the characteristic of the crop to values indicative of biomass of the crop, based on the first crop characteristic sensor signal and the first component characteristic sensor signal;
volume-to-biomass conversion logic configured to:
receive a second crop characteristic sensor signal generated by the forward-looking crop sensor having a second value indicative of the characteristic of crop in a second sensed region in front of the agricultural harvesting machine relative to a direction of travel of the agricultural harvesting machine;
generate a predictive value indicative of a biomass of crop in the second sensed region based on the second crop characteristic sensor signal and the conversion factor;
recommendation logic configured to receive the value indicative of the biomass of crop in the second sensed region and generate a recommendation to change operation of the controllable subsystem, based on the value indicative of the biomass of crop in the second sensed region; and
a control system that controls the controllable subsystem based on the generated recommendation.

2. The agricultural harvesting machine of claim 1 and further comprising:
volume generator logic configured to receive the crop characteristic signals and generate crop volume signals indicative of a volume of crop in the sensed regions.

3. The agricultural harvesting machine of claim 2, wherein the conversion factor is a volume-to-biomass conversion factor and wherein the conversion factor generator logic is configured to receive a crop volume signal and a component characteristic signal indicative of the biomass being processed when the crop from the sensed region affects the operation of the component and adapt the volume-to-biomass conversion factor based on the crop volume signal and the component characteristic sensor signal indicative of the biomass.

4. The agricultural harvesting machine of claim 2, wherein the forward-looking crop sensor comprises:
a crop height detector configured to detect an average height of the crop over the sensed regions in front of the agricultural harvesting machine.

5. The agricultural harvesting machine of claim 1, further comprising:
a threshing rotor;
an actuator that drives the threshing rotor; and
wherein the component sensor comprises:
a rotor actuator sensor configured to detect a rotor metric indicative of a load on the threshing rotor.

6. The agricultural harvesting machine of claim 1, further comprising:
time offset logic configured to determine a time offset between a first time, when the forward-looking crop sensor detects the characteristic of the crop and a second time, when the crop sensed by the forward-looking sensor at the first time is being processed by the agricultural harvesting machine at a point when the component sensor detects the characteristic of a component.

7. The agricultural harvesting machine of claim 6, wherein the conversion factor generator logic is configured to correlate the first crop characteristic sensor signal and the first component characteristic sensor signal based on the time offset.

8. The agricultural harvesting machine of claim 4, wherein the volume generator logic is configured to receive topographic valves indicative of an elevation of the sensed regions and wherein the volume generator logic is configured to determines the crop volume of crop in the sensed regions, based at least in part on the topographic values.

9. The agricultural harvesting machine of claim 1, wherein the adaptation logic utilizes a least mean square algorithms to intermittently calculate the conversion factor.

10. The agricultural harvesting machine of claim 1, wherein the conversion factor generator logic is configured to utilize a recursive least square error algorithm to intermittently calculate the conversion factor.

11. The agricultural harvesting machine of claim 1, and further comprising:
a propulsion subsystem, wherein the recommendation logic generates a ground speed recommendation and wherein the control system controls the propulsion subsystem based on the ground speed recommendation.

12. The agricultural harvesting machine of claim 1, further comprising:
datastore interaction logic that stores the adapted conversion factor in a datastore.

13. A method of controlling an agricultural harvesting machine, the method comprising:
detecting a crop characteristic value of a first crop at a first sensed region in front of the agricultural harvesting machine;
generating a first crop characteristic signal indicative of the crop characteristic value of the first crop at the first sensed region in front of the agricultural harvesting machine;
detecting a first operating characteristic value indicative of an operating characteristic of a working component of the agricultural harvesting machine as the working component processes the first crop, the first operating characteristic value being indicative of a density of the first crop;
generating an operating characteristic signal indicative of the detected first operating characteristic;
adapting a conversion factor used to convert between values of the crop characteristic and values of biomass, based on the first crop characteristic signal and the operating characteristic signal;
detecting a second crop characteristic value of a second crop at a second sensed region in front of the agricultural harvesting machine;
generating a second crop characteristic signal indicative of the crop characteristic value of the second crop at the second sensed region in front of the agricultural harvesting machine;
predicting a crop biomass value of the second crop at the second sensed region based on the adapted conversion factor and the second crop characteristic value;
generating, an operational recommendation based, at least in part, on the predicted crop biomass value; and
controlling the agricultural harvesting machine based on the operational recommendation.

14. The method of claim 13, further comprising:
determining a time offset that corresponds to a time it takes the first crop at the first sensed region in front of the agricultural harvesting machine to be processed by the working component of the agricultural harvesting machine.

15. The method of claim 14, wherein detecting the crop characteristic value comprises detecting an average height of the crop.

16. The method of claim 15, wherein generating the first crop characteristic signal comprises:
receiving a topographic value corresponding to the first sensed region at which the first crop is located; and
modifying the average height based on the topographic value.

17. The method of claim 13, wherein adapting the conversion factor comprises:
utilizing a recursive least square error algorithm.

18. The method of claim 13, further comprising:
automatically controlling a speed of the agricultural harvesting machine with a control system based on the generated operational recommendation.

19. The method of claim 13, wherein detecting the first operating characteristic value of the working component of the agricultural harvesting machine comprises:
detecting a metric of a threshing rotor actuator that actuates a threshing rotor, indicative of a load on the threshing rotor.

20. A method of controlling an agricultural harvesting machine, the method comprising:
receiving an initial volume-to-biomass conversion factor;
controlling the agricultural harvesting machine in a field based car the initial volume-to-biomass conversion factor;
detecting an average crop height of a first crop in a defined first region of interest forward of the agricultural harvesting machine;
determining a volume of the crop in the defined first region of interest based on the average height of the crop in the defined first region of interest;
calculating a time offset until the crop in the first region of interest is processed by a threshing subsystem of the agricultural harvesting machine;
detecting a force used to drive a threshing rotor of the threshing subsystem based on the time offset;
determining a density of the crop in the defined first region of interest based on the force used to drive the threshing rotor of the threshing subsystem;
adapting the initial volume-to-biomass conversion factor to generate an adapted volume-to-biomass conversion factor, based on the determined volume of the crop in the defined first region of interest, and the determined density of the crop in the defined first region of interest;

detecting an average crop height of a second crop in a defined second region of interest forward of the agricultural harvesting machine;

determining a volume of the crop in the defined second region of interest based on the average height of the second crop in the second region of interest; and predicting a biomass of the crop in the defined second region of interest based on the volume of the crop in the defined second region of interest and the adapted volume-to-biomass conversion factor; and controlling a speed of the agricultural harvesting machine in a field based on the predicted biomass of the crop in the defined second region of interest.

* * * * *